(12) United States Patent
Lamison

(10) Patent No.: US 8,235,628 B2
(45) Date of Patent: Aug. 7, 2012

(54) CONTINUOUSLY PRESSURIZED PIPELINE

(75) Inventor: Craig W. Lamison, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 1790 days.

(21) Appl. No.: 10/907,041

(22) Filed: Mar. 17, 2005

(65) Prior Publication Data

US 2006/0210361 A1 Sep. 21, 2006

(51) Int. Cl.
*F16L 1/12* (2006.01)
*F16L 55/07* (2006.01)
(52) U.S. Cl. .......... 405/168.3; 138/26; 138/39; 405/171
(58) Field of Classification Search .................. 405/158, 405/168.1, 168.2, 168.3, 168.4, 169, 170, 405/171, 211; 138/26, 39, 89, 109, 110
See application file for complete search history.

(56) References Cited

U.S. PATENT DOCUMENTS

| | | | | |
|---|---|---|---|---|
| 3,698,348 A | * | 10/1972 | Morgan | 114/245 |
| RE28,410 E | * | 5/1975 | Cox et al. | 405/168.3 |
| 3,965,713 A | * | 6/1976 | Horton | 72/146 |
| 4,117,692 A | * | 10/1978 | Oberg | 405/166 |
| 4,260,288 A | * | 4/1981 | Ellers et al. | 405/168.3 |
| 4,603,806 A | * | 8/1986 | Watanabe et al. | 138/171 |
| 5,072,622 A | * | 12/1991 | Roach et al. | 73/40.5 R |
| 5,419,183 A | * | 5/1995 | Keys | 73/49.5 |
| 5,924,454 A | * | 7/1999 | Dyck et al. | 138/89 |
| 5,927,762 A | * | 7/1999 | Webb | 285/123.15 |
| 6,155,748 A | * | 12/2000 | Allen et al. | 405/195.1 |
| 6,540,440 B1 | * | 4/2003 | Beaujean | 405/168.1 |
| 6,601,437 B2 | * | 8/2003 | Gotowik | 73/49.8 |
| 6,830,069 B2 | * | 12/2004 | Shillito et al. | 137/613 |
| 2004/0112431 A1 | * | 6/2004 | Burlock et al. | 137/317 |

OTHER PUBLICATIONS

Palmer, A.C., and King, R.A., "Subsea Pipeline Engineering", 2004, pp. 488-491, PennWell Corporation, Tulsa, Oklahoma.

* cited by examiner

*Primary Examiner* — Tara Mayo-Pinnock
(74) *Attorney, Agent, or Firm* — KBR IP Legal Dept.

(57) ABSTRACT

A pipeline segment 5, used for the manufacture of a thin-walled underwater pipeline 50. Terminal pipe sections 20 are at either end of main pipe section 10. Terminal pipe sections 20 are thick-walled or otherwise resistant to collapse due to external pressure. A pressure isolation device 30 maintains an internal pressure in main pipe section 10 above a shut off pressure. A pressure compensation system 35 can protect main pipe section 10 from collapse due to external pressure. Pipeline segments 5 can be manufactured by connecting and winding stalks 100 onto storage device 110 forming main pipe section 10. Terminal pipe section 20 can be connected to the lead end of main pipe section 10, and main pipe section 10 can be unwound from storage device 110 while towing.

38 Claims, 7 Drawing Sheets

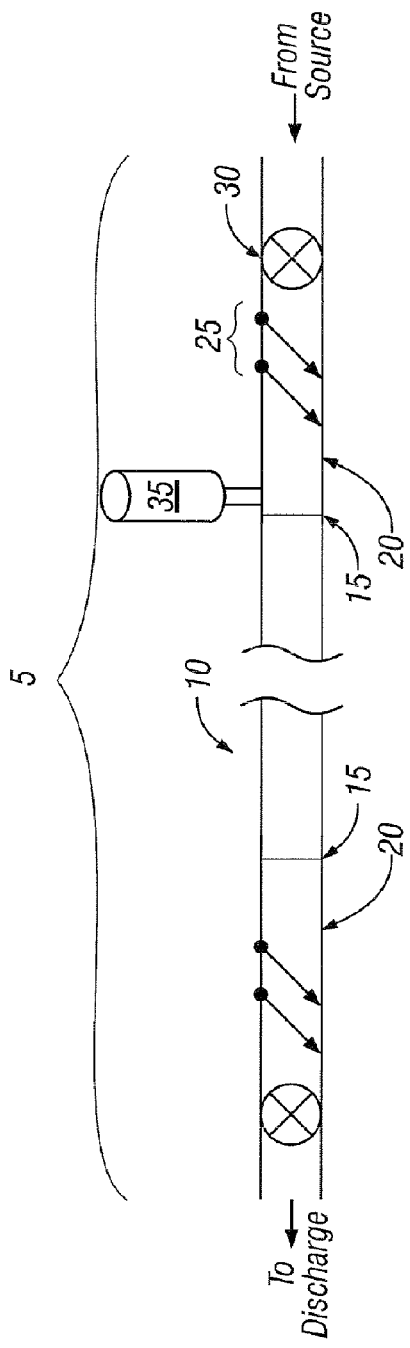
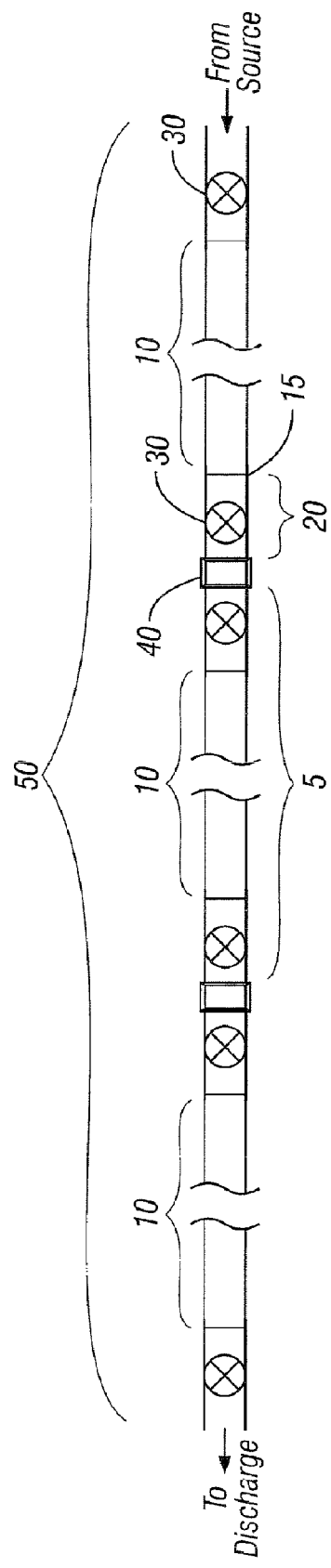
FIG. 5
FIG. 6

CONTINUOUSLY PRESSURIZED PIPELINE

BACKGROUND OF THE INVENTION

This invention relates to submerged pipelines and process equipment, and more particularly, to deepwater pipelines.

Hydrocarbon discoveries are being made in increasingly deeper water. Frequently, tankers or liquefied natural gas (LNG) carriers are used to address deepwater hydrocarbon transportation needs. Pipelines and ancillary equipment are also used, but must be designed to withstand the extreme collapse pressures found at great depths. Conventional pipeline design relies on the strength of the pipe to withstand the high external water pressures in such service. The high strength is provided by using higher grade steels and greater wall thicknesses, both of which can increase the cost of the pipe material and the difficulty of installation. The design for conventional pipe systems, such as those used in the hydrocarbon transportation industry, is based upon the expected maximum internal operating pressure ($P_{IO}$), as shown in FIG. 1, where the internal and external pressure of the pipe are equal and at atmospheric pressure during installation. In addition, for standard underwater pipe construction, the required pipe thickness (t) is based upon the external pressure head ($P_{EH}$) of seawater at the installation depth, as shown in FIG. 2. The lowest internal pressure that the pipe is expected to encounter during installation, operation, and maintenance, which can be a vacuum, requires the pipe wall to be thick enough to prevent collapse of the wall due to the external pressure head. Hydrocarbon discoveries now exist in water depths where the optimum pipe diameter with a conventionally designed wall thickness may not be installable by existing pipelay vessels.

The existing technology to export the product from deepwater to shore needs to be improved. The transportation of hydrocarbon products from producing areas to markets across large and often deep bodies of water is also in demand.

Underwater pipelines have been installed by the S-lay or J-lay method as defined by the shape assumed by the pipeline as it is lowered from the installation vessel. The pipe can be transported to the installation site by towing, by ship-borne reel, or as individual joints. The current capabilities of these techniques are limited. The present invention addresses these limitations.

SUMMARY OF THE INVENTION

The present invention discloses in one embodiment a thin-walled underwater pipeline, wherein safety, maintenance, constructability, and other concerns are addressed by a pipeline constructed in a segmental fashion. Each segment of a thin-walled underwater pipeline can have a main pipe section, and terminal pipe sections at either end of the main section. The terminal pipe sections are more resistant to collapse due to external pressure relative to the main pipe section. In one embodiment, the terminal pipe sections are thick-walled relative to the main pipe section. The segment can include a pressure isolation device, which can be a valve, for example, or a plurality of redundant pressure isolation devices, in each terminal pipe section to maintain internal pressure in the main pipe section above a set shut off pressure.

To facilitate installation at a specified depth, the main pipe section can be gas-pressurized above atmospheric pressure. For example, it can be pressurized to continuously provide a differential internal-external pressure that is sufficiently low so as to allow a thinner pipe wall to be used than required to prevent wall collapse at the full external hydrostatic pressure head applied during installation. As an additional precaution against collapse, the pipeline segment can include a pressure compensation system in communication with the main pipe section. The pressure compensation system in communication with the main pipe section can introduce pressurized fluid into the main pipe section when the internal pressure of the main pipe section drops below a set re-pressurization pressure. Thus, the pressure compensation system can operate to maintain the internal pressure in the main section at or above the re-pressurization pressure.

In another embodiment, the pipeline segments are assembled into a thin-walled underwater pipeline. The pipeline segments can be connected together between the terminal ends of adjacent segments to provide fluid communication between the adjacent main sections for the transmission of a fluid.

In another embodiment, the present invention provides a thin-walled underwater pipeline system having alternating main and pressure control pipe sections, forming a series of the pipeline segments described above. The main pipe sections are thin-walled relative to adjacent pressure control sections. The pressure control sections include pressure isolation devices to maintain internal pressure in adjacent main pipe sections above a set shut off pressure.

An embodiment of the invention provides a method for manufacturing an underwater pipeline segment that can include: fabricating and winding a continuous pipe section on a reel, wherein the continuous pipe section has a lead end and a trailing end; attaching the lead end of the continuous pipe section to a tow vessel; unwinding the continuous pipe section; and, optionally attaching the trailing end of the continuous pipe section to a tow vessel. The unwinding and attaching steps can be conducted at a marine terminal. If desired, buoyancy devices can also be installed to facilitate towing and installation. To facilitate towing, the lead end and trailing end of the continuous pipe section can be attached to a towing assembly. The method of forming the pipeline segments can be extended so as to form a pipeline, where the continuous section of pipe can be towed to a location remote from the marine terminal and installed in an underwater pipeline.

The present invention provides a method to manufacture the thin-walled underwater pipeline as described above. The method can include: attaching terminal pipe sections at either end of a main pipe section wherein the terminal pipe sections are more resistant to external-pressure collapse relative to the main section; installing a pressure isolation device in each terminal pipe section; pressurizing the main pipe section to a pressure above atmospheric pressure; and, operating the pressure isolation device to maintain internal pressure in the main pipe section above a set shut off pressure.

The method for manufacturing an underwater pipeline segment using a reel as described above can also be used to manufacture a thin-walled underwater pipeline segment. This method of manufacturing a thin-walled underwater pipe line segment can include: fabricating and winding a main pipe section on a reel, wherein the main pipe section has a lead end and a trailing end; attaching a terminal pipe section to the lead end of the main pipe section; attaching the lead end of the main pipe section to a tow vessel; unwinding the main pipe section; attaching a second terminal pipe section to the trailing end of the main pipe section; pressurizing the main pipe section; operating the pressure isolation device to maintain internal pressure in the main pipe section above a set shut off pressure; and, optionally attaching the trailing end of the main pipe section to a tow vessel; wherein the terminal pipe sections are thick-walled relative to the main pipe section. Alternatively, the thin-walled underwater pipeline segment of this invention can be manufactured in a similar fashion by shipborne reel.

The thin-walled underwater pipeline segment of this invention can be readily installed to form a thin-walled underwater pipeline. A method to manufacture a pipeline using the thin-walled pipeline segments can include assembling a plurality of pipe segments, as described herein, pressurizing the pipeline segments, submerging the pressurized pipeline segments, and sequentially connecting the pipeline segments together to form a pipeline. The pipeline segments can include multiple pressure isolation devices in each terminal section. The pipeline formed by the pipeline segments can further include a pressure compensation system in communication with the main pipe section. The method can also include fabricating and winding a main pipe section on a reel, and unwinding the main pipe section from the reel.

In one embodiment of the present invention, the pressure compensation system can include: a vessel having an outlet in communication with a pipe segment, and an inlet in communication with a source of pressurized fluid; a first pressure isolation device adjacent to the inlet; a second pressure isolation device adjacent the outlet; and, a trap in communication with the vessel intermediate the first and second pressure isolation devices.

In another embodiment of the present invention, a pressure compensation system for use with a thin-walled underwater pipeline can include: a thin-walled underwater pipe section having a wall thickness disposed at a depth wherein the pipe section may collapse below a minimum internal pressure; a first fluid to pressurize the pipe section above the minimum internal pressure during normal pipeline operation; a vessel having an inlet in fluid communication with a second pressurized fluid and an outlet in fluid communication with the pipe section; and, a first pressure isolation device adjacent to the outlet and having a low pipeline pressure actuation set point, above the minimum internal pressure and below a pressure of the second pressurized fluid to introduce the second pressurized fluid into the pipe section and maintain pressurization of the pipe section above the minimum internal pressure if the pressure in the pipe section from the first fluid becomes less than the low pipeline pressure set point. The pressure compensation system can also include a second pressure isolation device adjacent to the inlet, having a low vessel pressure actuation set point to introduce the second pressurized fluid into the vessel and maintain a pressure in the vessel at or above the low vessel pressure set point. In another embodiment, the pressure compensation system can include a trap in fluid communication with the vessel intermediate the first and second pressure isolation devices to collect any fluid that may leak from the pipe segment into the vessel through the first pressure isolation device. In another embodiment, the pressure compensation system can include a flexible bladder in communication with the first pressure isolation device, wherein the bladder is filled with the second pressurized fluid and disposed underwater for hydraulic compression of the bladder above the low pipeline pressure set point.

BRIEF DESCRIPTION OF THE DRAWINGS

FIG. 5 is a schematic illustration of a pipeline segment according to one embodiment of the present invention.

FIG. 6 is a schematic illustration of pipeline according to one embodiment of the present invention.

DETAILED DESCRIPTION

The present invention can be used during installation, operation, and maintenance of a pipeline. The present invention can provide a pipeline having a reduced wall thickness, thus decreasing the material costs and the cost of installation. A pipeline manufactured by the present invention can be installed by the S-Lay, J-Lay, towing, reeling, or other conventional installation methods.

Figure 1:
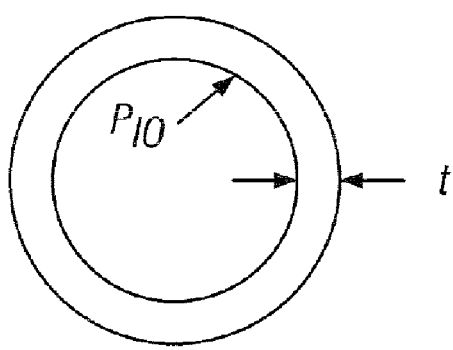
FIG. 1 (prior art) is a cross-sectional illustration of the conventional design basis for a pipe, determining thickness upon the maximum internal operating pressure, $P_{IO}$.
Figure 2:
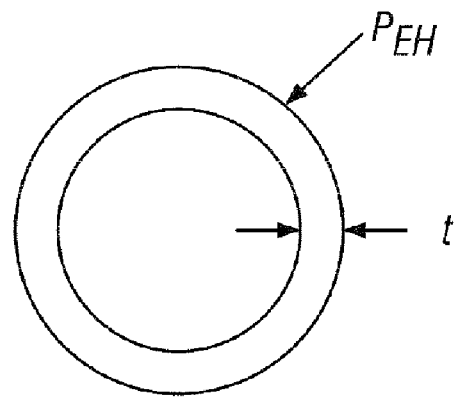
FIG. 2 (prior art) is a cross-sectional illustration of a conventional design basis for an underwater pipe, determining thickness upon the maximum external pressure head, $P_{EH}$.
Figure 3:
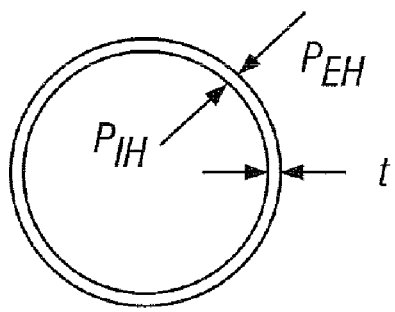
FIG. 3 is a cross-sectional illustration of the design basis for determining thickness of an underwater pipe where the pipe is installed liquid-filled according to one embodiment of the invention.
Figure 4:
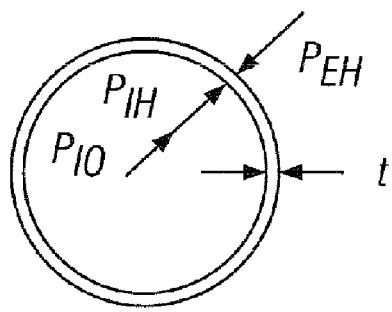
FIG. 4 is a cross-sectional illustration of the design basis for determining thickness of an underwater pipe where the pipe is installed with a pressurized liquid or gas according to one embodiment of the invention.

The present invention can minimize the required thickness (t) for pipe that will be installed underwater (sub-sea). Design of the thin-walled pipeline segment of the present invention is conducted by one of the following methods. In the first method, the external pressure head is neutralized by filling the pipeline segment with an internal fluid, whereby an internal pressure head ($P_{IH}$) decreases the required wall thickness, as shown in FIG. 3. In the second method, the external pressure head is neutralized by internally pressurizing the pipeline segment and/or filling the pipeline segment with an internal fluid whereby an internal operating pressure or an internal operating pressure coupled with an internal pressure head partly or wholly neutralize the external pressure head, decreasing the required wall thickness of the pipe, as shown in FIG. 4.

The required thickness also depends upon the material of construction, corrosion allowances, bending strains, possible flotation of the pipeline, stability, installation pipelay tension, and other factors commonly known.

Figure 7:
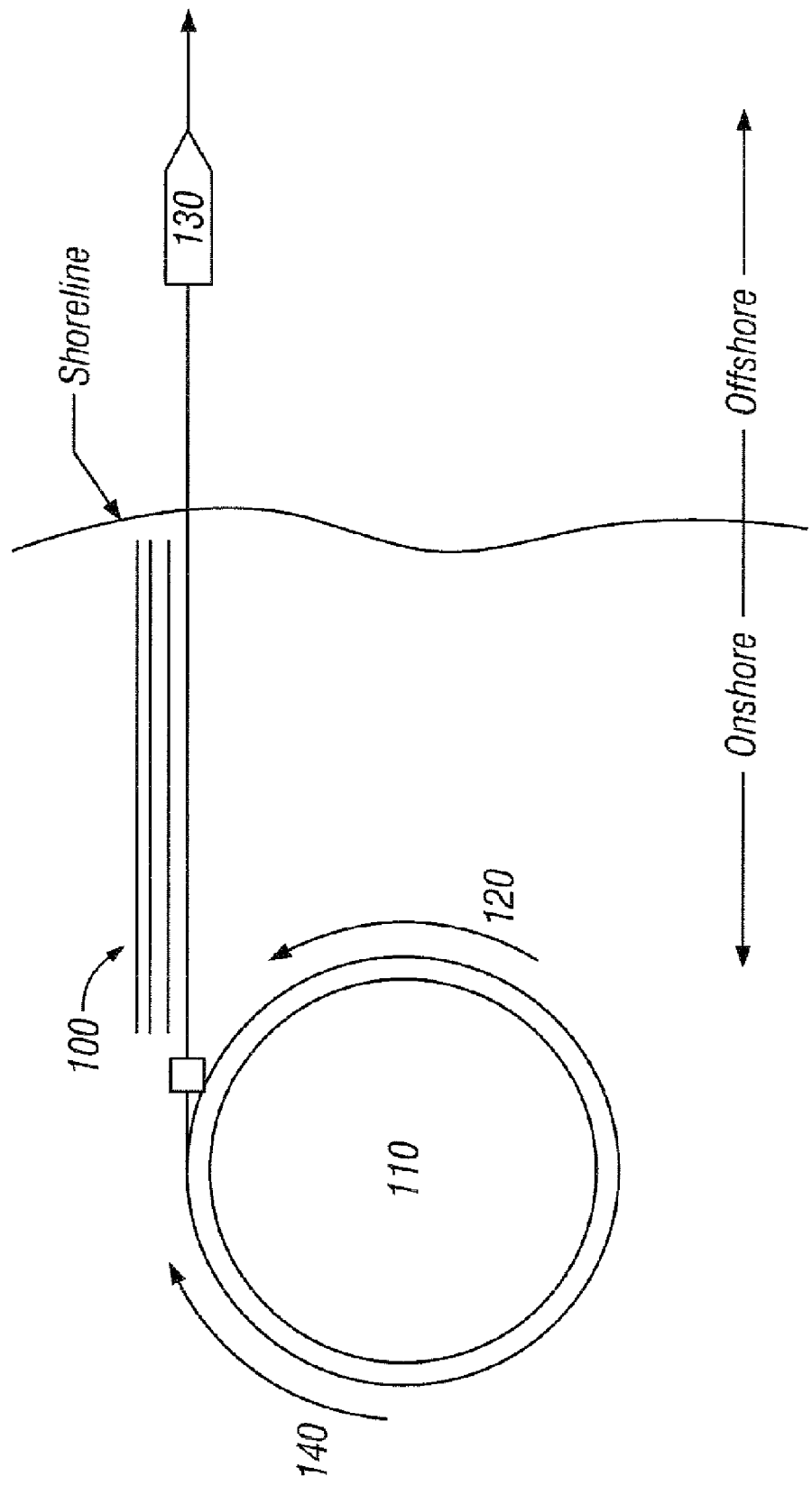
FIG. 7 is a schematic illustration in plan of a pipeline segment manufacture according to one embodiment of the present invention.

Installation of a thin-walled pipeline can require that the internal pressure head ($P_{IH}$) and/or internal pressure ($P_{IO}$) of the pipeline be held above a minimum internal pressure. If the pressure in the thin-walled pipeline decreases below the minimum internal pressure, the thin-walled pipe could collapse as a result of the external pressure head ($P_{EH}$). The present invention can continuously maintain the pipeline above the required minimum internal pressure during installation, start-up/commissioning, and during maintenance of the pipeline, as illustrated in FIGS. 5-7.

In FIG. 5, a pipeline segment 5 has a main pipe section 10 connected to terminal pipe sections 20 at either end thereof.

The main and terminal pipe sections can be connected at seams 15, which can be welds, flanges, screwed connections, or the like. An isolation device 30 is located in each terminal pipe section 20, installed in a manner to maintain the pressure in the main section of pipe above a minimum pressure set point. Redundant isolation devices 25 can be located in the terminal pipe sections. Isolation devices 25 and 30 can be a high integrity pipeline protection system (HIPPS), modified subsea safety isolation valves (SSIV), flow check valves, pressure check valves, chokes, pressure regulators, swing check valves, and other similar pressure isolation devices that are commonly used to maintain pressure in a section of pipe below a maximum pressure set point but are herein used to keep pressure above a minimum pressure set point. Isolation devices 30 and redundant isolation devices 25 can be selected as different types so as to minimize the risk of pressure loss.

Pressure isolation devices 25, 30 used in pipeline segment 5 prevent a particular emergency situation from arising: wall collapse of the main pipe section 10. Terminal sections 20 can be equipped with sensors to monitor the pressure upstream or downstream of pressure isolation devices 25, 30. The devices 25, 30 can isolate the main pipe section 10 when the pressure falls to a low-pressure set point. In this manner, pressure isolation devices 25, 30 perform so as to isolate the main pipe section 10 from excess pressure loss, i.e. to maintain the pressure in the main pipe section 10 above a minimum pressure set point, above the pressure where the main pipe section 10 might collapse due to the external hydrostatic pressure. Flow driven check valves can perform a similar function for the upstream terminal section 20. When the pressure upstream of the valve increases above the shut-off set point, the underwater isolation valve can open and normal operation can resume.

A pressure compensation system 35 in communication with the main pipe section 10 can be provided to adjust the pressure in the main section of pipe due to a sudden disturbance, such as a temperature change during submersion or a change in supply pressure during operation, for example. Pressure compensation system 35 can be a piston, bellows or diaphragm type compensation system, a pipeline flooding system, or a pressurized gas supply, for example. Pressure compensation system 35 can be located in the terminal pipe section between isolation devices 25 and 30 and the main pipe section 10, or it can be located in direct communication with main pipe section 10.

The redundant isolation devices 25 and the pressure compensation system 35 can redundantly protect the main pipe section 10 from wall collapse. Isolation devices 30 and/or redundant isolation devices 25 can also be installed in a manner to maintain the interior of the pipeline segment 5 free of water during installation.

Figure 11:
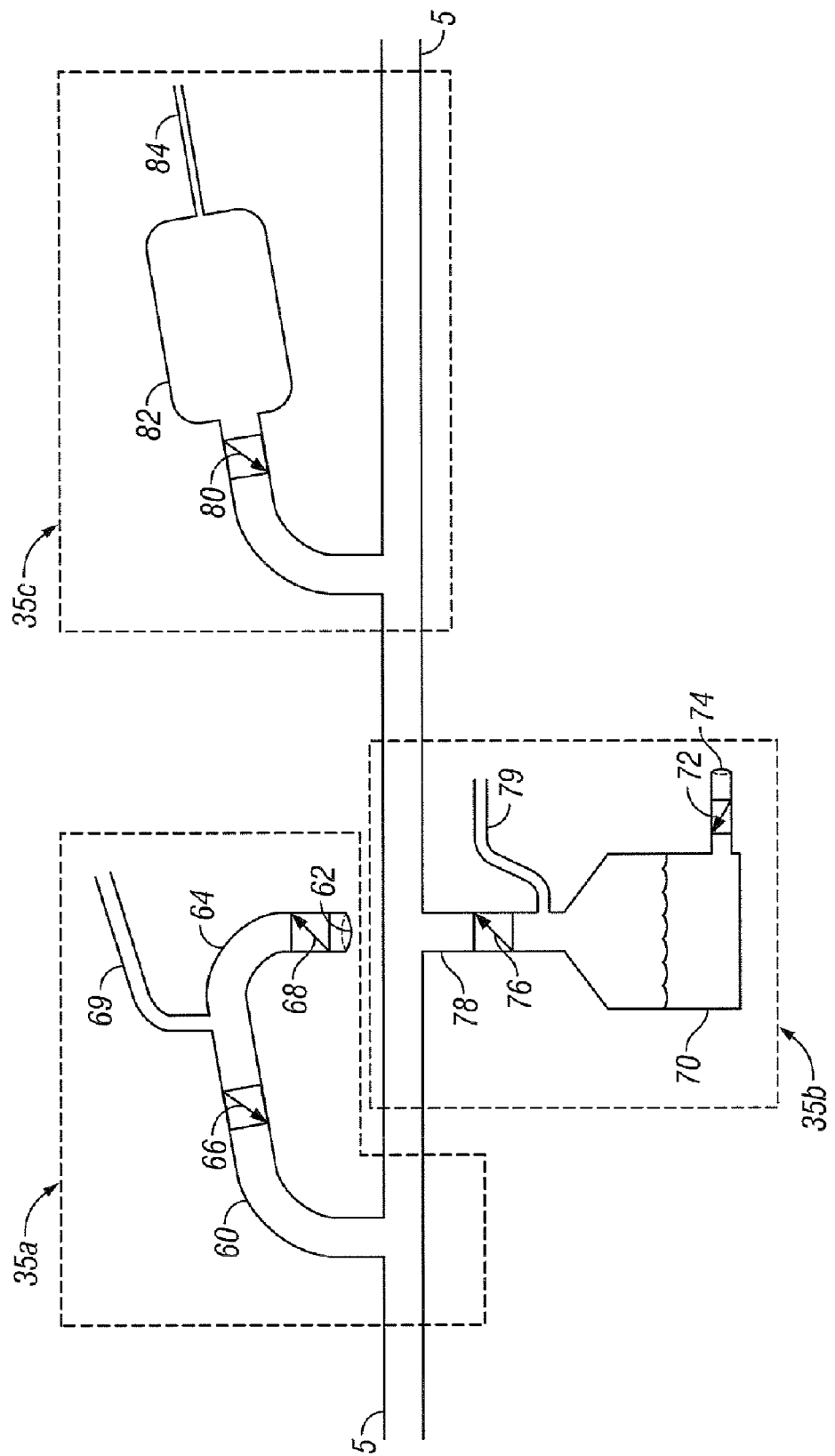
FIG. 11 is a schematic illustration of pressure compensation systems according to various embodiments of the present invention.

FIG. 11 illustrates several embodiments of a pressure compensation system 35 allowing external pressure to equalize the internal pressure in the event of a pressure drop within one or more pipeline segments 5. In the event that the internal pressure drops below a minimum set pressure, pressure compensation systems 35a, 35b, or 35c can flood pipeline segments 5 with fluid, such as water, seawater, a hydrocarbon, a pressurized gas, or other suitable fluid. Multiple and/or redundant pressure compensation systems 35, spaced along a pipeline, can be used to ensure rapid response in the event of a pressure loss.

Pressure compensation system 35a can have upwardly sloped pipe 60 connected to a top portion of pipeline segment 5. Pipe 60 can terminate at open inlet 62, located below an uppermost portion 64 of the pipe 60. Intermediate pressure isolation device 66 can be located between pipeline segment 5 and uppermost portion 64. Inlet pressure isolation device 68 can be located between open inlet 62 and uppermost portion 64. Trap 69 can be located adjacent uppermost portion 64. Pressure isolation devices 66, 68 can be check valves or a HIPPS or other pressure isolation devices. In the event of a pressure loss in pipeline segment 5, where the pressure drops below the pressure set point of pressure isolation devices 66, 68, seawater will flood the pipeline, flowing from open inlet 62 into pipeline segment 5 inhibiting collapse. To avoid releasing hydrocarbons or other pipeline contents to the environment, trap 69 can be provided to recover any product leakage through pressure isolation device 66. Trap 69 can be connected to a local or remote collection facility.

Pressure compensation system 35b can protect pipeline segment 5 from collapse in a manner similar to that described for pressure compensation system 35a. Tank 70 can be connected to a bottom portion of pipeline segment 5. Pressure isolation device 72 can be located between bottom inlet 74 and tank 70. Pressure isolation device 76 can be located between top outlet 78 and pipeline segment 5. Trap outlet 79 can be located adjacent a top portion of tank 70 to allow collection of any product leakage through pressure isolation device 76.

Pressure compensation system 35c can also be used to protect pipeline segment 5 from wall collapse. Pressure isolation device 80 can connect flexible bladder 82 to pipeline segment 5. Fill line 84 from a local or remote facility can be used to supply bladder 82, which is flexible and thus pressurized by ambient seawater. In the event of a pressure loss in pipeline segment 5, where the pressure drops below the pressure set point of pressure isolation device 80, the pressurized fluid in flexible bladder 82 flows into pipeline segment 5, and can compensate for the pressure loss so as to prevent wall collapse.

Additional process or ancillary pipeline equipment, such as pumps, separators, or the like, can also be installed within main pipe section 10 without varying from the scope of the present invention.

Figure 8:
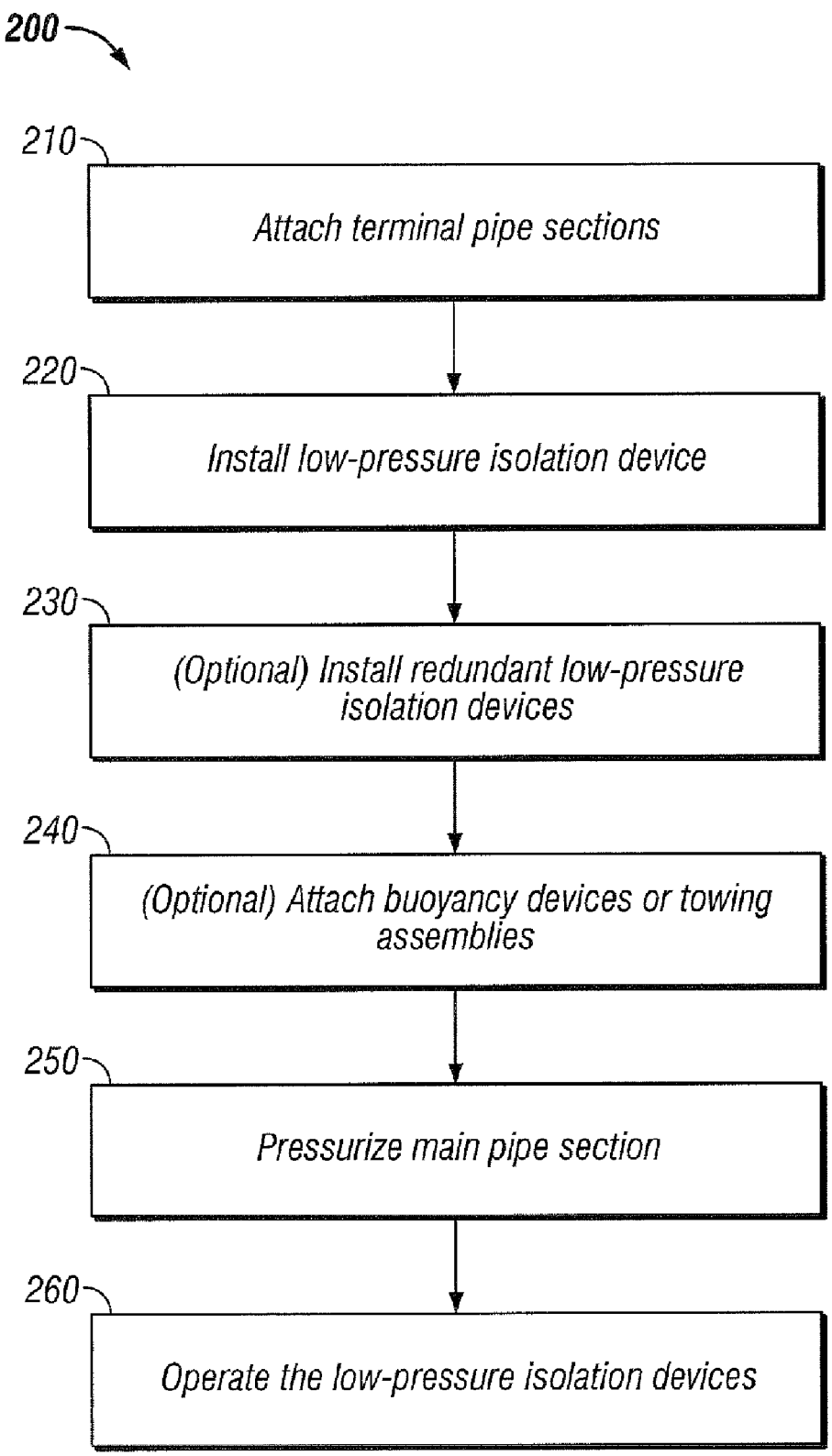
FIG. 8 is a flow chart of a pipeline segment manufacturing method according to one embodiment of the present invention.

One sequence that can be used to manufacture the pipeline segment 5 is discussed below in reference to FIG. 8. Pipeline segment 5 is manufactured and operated, as shown in process 200. Terminal pipe sections 20 are attached in step 210 to either end of a main pipe section 10. Low-pressure isolation device 30 is installed in the terminal pipe section 20 in step 220. In step 230, redundant low-pressure isolation devices 25 and pressure compensation system 35 can be installed in terminal pipe section 20, if required. Other equipment such as buoyancy devices or towing assemblies can be installed, as needed, in step 240. The main pipe section can then be pressurized in step 250 above atmospheric pressure and above the minimum pressure set point required to neutralize or minimize the external pressure head to be encountered at installation depth. After pressurization, the low-pressure isolation devices are operated in step 260 such that the pressure in the main pipe section 10 is maintained above the minimum set pressure, facilitating installation as described below. This sequence applies when pressurizing the main pipe section through the pressure isolation device. Steps 250 and 260 may be reversed if pressurizing through a direct connection bypassing the pressure isolation devices.

The thin-walled main pipe section 10 can be protected from wall collapse by installation of the pipeline segment 5 while it is completely filled with fluid of a greater, similar or lesser density than the external fluid. The isolation device 30 maintains the internal pressure head which partially or completely offsets the external pressure head. One method to maintain the internal pressure during commissioning and operation can involve replacing the installation fluid in the main pipe section with an operational fluid without emptying or depressurizing the main pipe section 10 during commissioning and startup.

The thin-walled main pipe section 10 can be kept under continuous internal pressure by installation of the pipeline segment 5 while it is partially filled with fluid of similar, greater, or lesser density than the external fluid and pressurized above atmospheric pressure. The main pipe section 10 can be gas-pressurized above atmospheric pressure. Isolation devices 30 can be low-pressure isolation devices configured to retain and maintain the pressure in the main pipe section 10 above a minimum pressure set point during installation, commissioning, operation, and maintenance. In this embodiment, an internal pressure is maintained which partially or completely offsets the external pressure head. Again, the method to maintain the internal pressure during commissioning and operation can be by replacing the installation fluid or gas in the main pipe section 10 with an operational fluid without emptying or depressurizing the section during commissioning and startup.

Proper design and operation of a thin-walled pipeline can avoid depressurization to address issues such as flow assurance, shutdown, or safety. For example, because the pressure balance can be maintained in the main pipe section 10 during commissioning, vacuum drying is avoided. If desired, the main pipe section 10 can be commissioned using pressurized air, nitrogen or chemical hydrate mitigation, for example, until drying is complete.

FIG. 6 illustrates a completed pipeline 50 using a plurality of the pipeline segments 5 of FIG. 5. The pipeline 50 can be generally described as having a first terminal pipe section 20 connected to a source. A main pipe section 10 is connected to the first terminal pipe section 20. The main pipe section 10 is also connected to a second terminal pipe section 20. The terminal pipe sections 20 are thick-walled relative to the main pipe section. Depending on water depth along pipeline 50 and internal or external pressure variations, wall thickness can vary from one main pipe section 10 to the next. Pressure isolation devices 30 can be located in the terminal pipe sections. The last terminal pipe section 20 can be connected to a discharge, completing the pipeline.

If required, multiple pipeline segments 5 can be connected in series, where each pipeline segment 5 has the independent ability to maintain a minimum internal pressure so as to prevent wall collapse of the respective main pipe section 10. In this manner, maintenance or replacement can be performed on independent sections of the pipeline 50 without risking the collapse of the other independently pressurized sections. Additional conventional pipeline equipment and conventionally designed pipe 40, as needed for pipeline operation, can be installed between adjacent terminal pipe sections 20 without deviating from the scope of the present invention. Equipment 40 can include compressors, pumping stations, shut-off valves, fittings, and other conventional equipment known in the art. One method that can be used for installation of a pipeline using the pipeline segments 5 is discussed below in reference to FIG. 10.

The pipeline segments 5 can be manufactured and installed using the S-Lay, J-Lay, towed, reeled, or other conventional installation methods. During installation, the pipeline segments 5 can be lowered through the entire water column. In one installation method, the portion of the pipeline or pipeline segment in the upper part of the water column, where wall thickness is sufficient to prevent collapse, can be left empty to reduce lay tension and facilitate installation. The portion of the pipeline or pipeline segments in the lower part of the water column, where wall thickness is insufficient to prevent collapse, is filled or flooded with a fluid to neutralize or minimize any external pressure head so as to prevent collapse. Controlled flooding or pressurization and monitoring of the pipeline or pipeline segments can be done during pipelay to optimize collapse resistance versus installation tension. The fluid used to neutralize or minimize the external pressure head can range in density and compressibility from that of a gas to that of seawater or drilling fluid.

In a second installation method, that portion of the pipeline or pipeline segments in the upper part of the water column, where wall thickness is sufficient to prevent collapse, can be left empty to reduce lay tensions and facilitate installation. The portion of the pipeline or pipeline segments in the lower part of the water column, where wall thickness is insufficient to prevent collapse, can be pressurized to neutralize or minimize the external pressure head so as to prevent wall collapse. The pressure can be generated by a gas or by a liquid of a similar or different density than the fluid used to partially fill the pipeline so as to optimize collapse resistance versus installation tension. A movable plugging device known in the art can be used between pressurized and unpressurized sections. It can be moved in the line as pipe is lowered so as to remain at the necessary depth to be effective.

In another pipeline installation method, the pipeline segments, once manufactured, are maintained under a constant pressure so as to neutralize or minimize the effect of the external pressure head and to prevent wall collapse. Once pressurized, the pipeline segment will have a continuous internal pressure. The constant pressure can be conveniently generated by a compressible gas, such as air, nitrogen, or the like.

Figure 9:
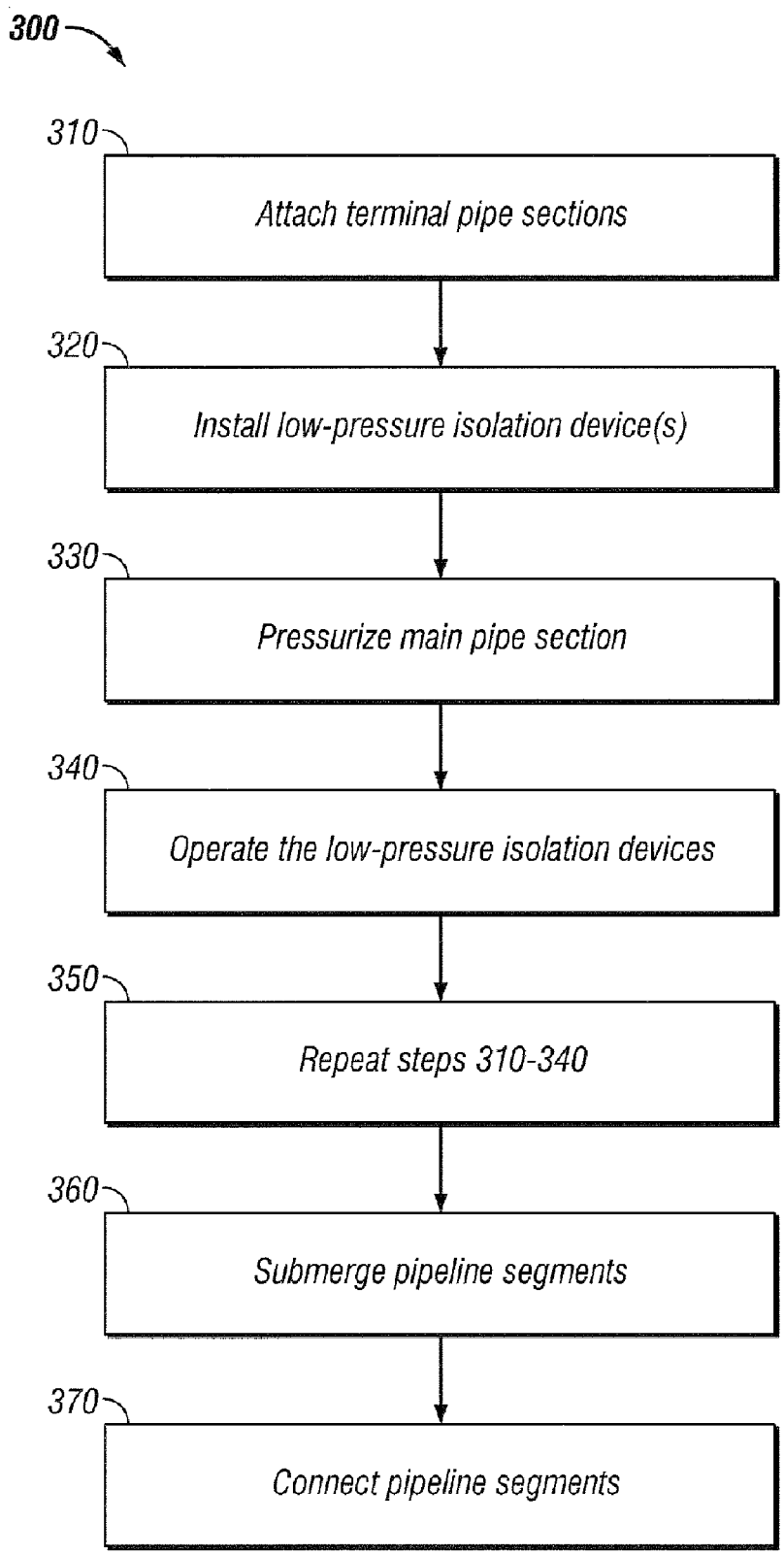
FIG. 9 is a flow chart of a pipeline segment manufacturing method according to one embodiment of the present invention.

Process 300 of FIG. 9 further illustrates a method to manufacture a pipeline 50 using the pipeline segments 5 of the present invention. In step 310, terminal pipe sections 20 can be attached to the ends of a main pipe section 10. Low-pressure isolation devices 30 are installed in step 320 in the terminal pipe section 20. Redundant low-pressure isolation devices 25 and pressure compensation system 35, and other equipment such as buoyancy devices or towing assemblies can also be installed, as needed. The main pipe section can then be pressurized in step 330 above atmospheric pressure and above the minimum pressure set point required to neutralize or minimize the external pressure head to be encountered at installation depth. After pressurization, the low-pressure isolation devices are operated in step 340 such that the pressure in the main pipe section 10 is maintained above the minimum set pressure. This sequence applies when pressurizing the main pipe section through the pressure isolation device. Steps 330 and 340 may be reversed if pressurizing the main pipe section is done through a direct connection bypassing the pressure isolation devices. Steps 310 through 340 are repeated in step 350, manufacturing multiple pipeline segments 5. The pipeline segments 5 are then submerged in step 360 and connected end-to-end in step 370, forming a pipeline 50 having a plurality of pipeline segments 5. Steps 360 and 370 can be effected in either order.

The commercial advantages of the continuous internal pressurized pipeline (CIPP) segments include cost savings on pipe materials and increased speed and reduced cost of installation. By way of example, a thin-walled pipeline can be designed for the maximum external pressure found at a 3050 m (10,000 ft) depth in seawater, a minimum product specific gravity of 0.8, and a maximum internal pressure of 15 MPa (2220 psig). Depending on pipe diameter and other design parameters, the wall thickness of the thin-walled main pipe section 10 could be approximately 40% less than for the prior art thick-walled pipe designed to be empty or depressurized at any point in its design life, due to the ability to maintain the main pipe section above a minimum pressure set point.

A comparison of gas and oil pipeline designs is given in Table 1. API RP 1111 (3$^{rd}$ Edition) Limit State Design has been used to determine adequate wall thicknesses for bursting, collapse, and buckling under external pressure and bending. Bursting was also checked using ASME B31.4/31.8 approach for the continuous internal pressurized pipeline (CIPP) cases, utilizing the pipeline segment embodiments of the present invention. The largest wall thickness calculated by each of these methods is taken as the minimum allowable wall thickness that can safely be used. The results presented in Table 1 represent calculations typical for pipeline design in the Gulf of Mexico, at depths greater than 1520 m (5000 feet).

TABLE 1

| | Example | | | | |
|---|---|---|---|---|---|
| | Comp. 1 | Comp. 2 | 1 | Comp. 3 | 2 |
| Pipeline Type | Conventional Oil | Conventional Oil, Flooded | CIPP Oil | Conventional Gas | CIPP Gas |
| O.D., cm (in.) | 50.8 (20) | 50.8 (20) | 50.8 (20) | 61 (24) | 61 (24) |
| Min. Pressure, MPa-gage (psig) | 0.0 (0) | 0.0 (0) | 5.2 (750) | −0.10 (−15) | 20.3 (2950) |
| Max. Pressure, MPa-gage (psig) | 15.3 (2220) | 15.3 (2220) | 15.3 (2220) | 17.2 (2500) | 24.65 (3575) |
| Wall Thickness, API, cm (in.) | 1.1 (0.42) | 1.1 (0.42) | 1.1 (0.42) | 0.61 (0.24) | 1.5 (0.61) |
| Wall Thickness, ASME, cm (in.) | 1.1 (0.44) | 1.1 (0.44) | 1.1 (0.44) | 0.64 (0.25) | 1.7 (0.65) |
| Wall Thickness, API Collapse, cm (in.) | 3.4 (1.3) | 1.55 (0.61) | 0.91 (0.36) | 4.1 (1.6) | 1.1 (0.43) |
| Wall Thickness, API Bend and Pressure, cm (in.) | 2.9 (1.2) | 1.6 (0.62) | 1.0 (0.41) | 3.5 (1.4) | 1.2 (0.49) |

A conventional oil pipeline installed without pressurization or flooding, having a nominal outside diameter of 50.8 cm (20 inches), will require a minimum wall thickness of 3.4 cm (1.3 in.) based on API collapse estimates, as shown in Comparative Example 1. By comparison, calculation results for a flooded installation require a minimum wall thickness of 1.6 cm (0.62 in.) based upon bending and external pressure, as shown by Comparative Example 2. Calculation results for a CIPP installation utilizing the pipeline segment of the present invention are given in Example 1, requiring a minimum wall thickness of 1.1 cm (0.44 in.) based upon ASME burst calculations. A 68% decrease in required wall thickness for an oil pipeline is estimated by using the continuously pressurized pipeline segment of the present invention.

Table 1 also compares results for a gas pipeline. The gas pressure estimated for operating conditions is based upon 3050 m (10,000 ft) depths. The conventional gas pipeline, which is typically vacuum-dried after installation, requires a minimum wall thickness of 4.1 cm (1.6 in.) based upon API collapse estimates, as shown in Comparative Example 3. Calculations for a gas pipeline installed utilizing the pipeline segment of the present invention (CIPP) are given in Example 2, requiring a minimum wall thickness of 1.7 cm (0.65 in.) based upon ASME burst calculations. A 59% decrease in wall thickness is estimated when using the continuously pressurized pipeline segment of the present invention. The design pressure ranges for the CIPP cases, of course, should be within a practical normal operational range of pressures.

Table 2 provides similar calculations performed for a gas pipeline that can be installed in the Mediterranean region, with depths exceeding 2130 m (7000 ft). A decrease in wall thickness from 3.0 cm to 1.7 cm (1.2 in. to 0.68 in.) is possible, assuming minimal bottom currents due to the extreme depths, as shown by the calculation results given in Comparative Example 4 (vacuum dried) and Example 3 (CIPP).

TABLE 2

| | Example | |
|---|---|---|
| | Comp. 4 | 3 |
| Pipeline Type | Conventional | CIPP |
| O.D., cm (in.) | 61 (24) | 61 (24) |
| Min. Pressure, MPa-gage (psig) | −0.10 (−15) | 17.06 (2475) |
| Max. Pressure, MPa-gage (psig) | 19.4 (2813) | 20.17 (2925) |
| Wall Thickness, API, cm (in.) | Non-controlling | 1.6 (0.64) |
| Wall Thickness, ASME, cm (in.) | Non-controlling | 1.7 (0.675) |
| Wall Thickness, API Collapse, cm (in.) | 3.02 (1.19) | 1.7 (0.65) |
| Wall Thickness, API Bend and Pressure, cm (in.) | Non-controlling | 1.7 (0.65) |

Fabrication of pipeline segments can be performed at sea or on land. Fabrication at sea can be done piecemeal (joint by joint) aboard the vessel during installation. Fabrication onshore involves connecting the joints into long strings that can be wound onto a reel for unreeling and installation offshore and/or that can be towed to the offshore site. Increasing the length of a pipeline segment that can be fabricated at a tow site onshore can decrease the number of underwater connections between export segments, reducing pipeline costs and increasing pipeline reliability.

In one embodiment of the invention, the pipeline segment is fabricated on land and towed to sea for installation. The on-land fabrication method combines reeling and towing to expand the length and diameter of the pipe that can be installed beyond what either method is currently capable of. The method can be used for any pipeline, but is particularly beneficial for continuously pressurized deepwater underwater pipeline designs, as described above, that are beyond the installation capability of lay vessels or are too long to fabricate at current sites.

Figure 10:
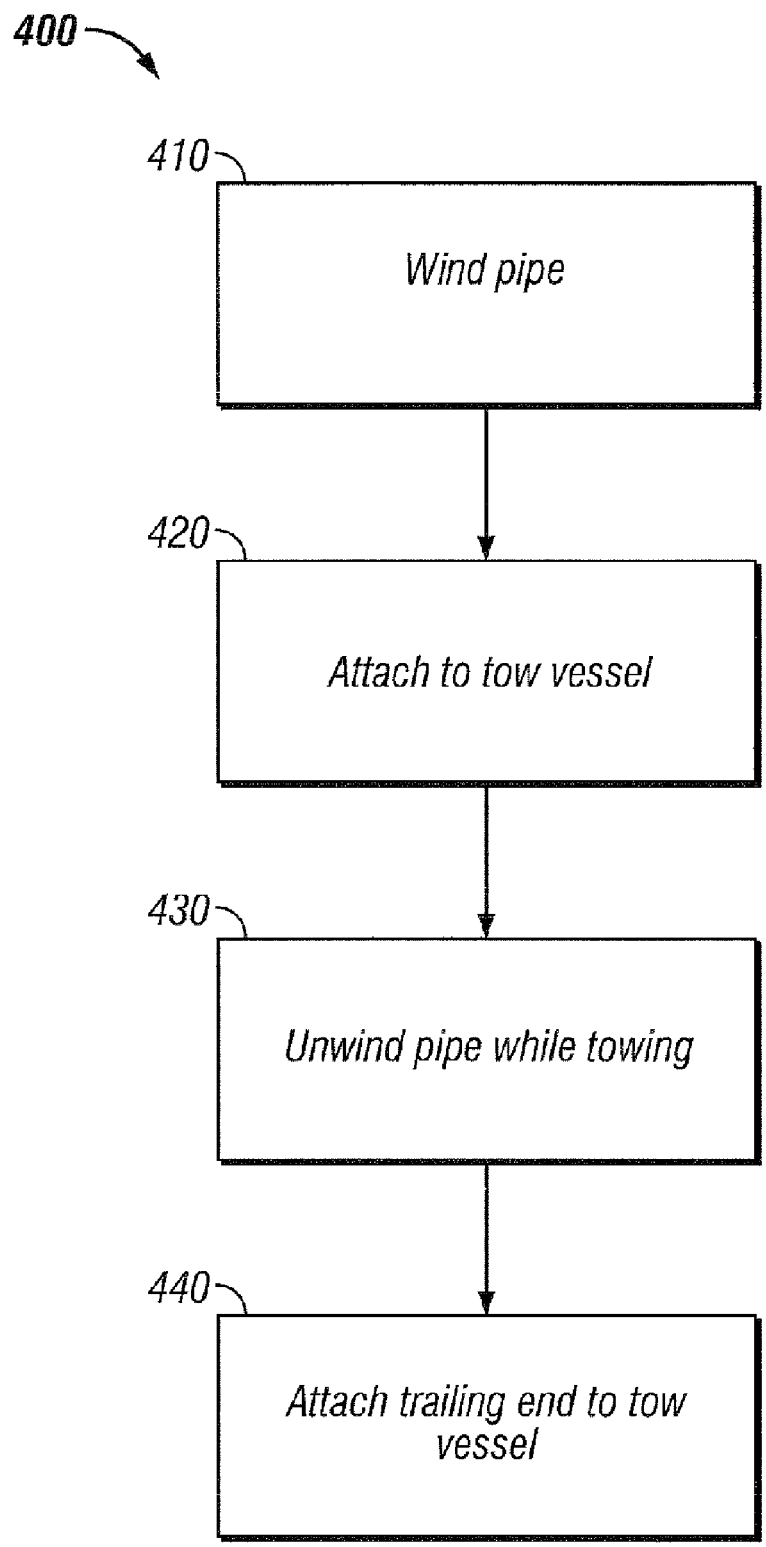
FIG. 10 is a flow chart of a pipeline manufacturing method according to one embodiment of the present invention.

The pipeline segment can be fabricated as illustrated in FIG. 7, and further shown by process 400 of FIG. 10. In step 410, stalks or joints of pipe 100 are connected together, usually by welding, to create a continuous pipe section, as site geometry permits. A first stalk 100 is partially wound, in the direction of fabrication rotation 120, onto the storage device 110 with an adequate length of the trailing end left unwound for connection to the next stalk 100. A second stalk 100 is moved in line with trailing end of first stalk 100, and the second stalk is connected to the first. The winding procedure is repeated for the second stalk. The winding and connecting steps are repeated for subsequent stalks 100 until the desired length of pipe has been connected.

As shown in FIG. 7, the trailing end of the pipe on the storage device becomes the leading end of the tow string. Other arrangements are possible, depending on factors such as geometry of the site and design of the reeling device 110, and are within the scope of the present invention. For example, the reel can be configured to allow the first pipe onto the reel to be the first pipe off the reel by having one layer on the reel and putting pipe on the reel from the bottom to the top and taking it off from the top to the bottom. A conventional towing head or assembly can be attached to the leading end of the tow string. The leading end of the tow string can be connected by rigging to tow vessel(s) 130 in step 420. In step 430, the tow string is pulled offshore by the tow vessel(s) and the tow string is unwound from storage device 110, which is rotated in the towing rotation 140. Pipe straighteners can be used as necessary to remove any residual bending from the pipe. After the tow string is unwound from storage device 110, a towing assembly can be attached to the trailing end of the tow string. The trailing end of the tow string can also be connected by rigging to additional trailing tow vessel(s) 130 in step 440 to provide control and holdback tension during towing.

A pipeline segment 5 of the present invention can be manufactured in a similar manner. The main pipe section 10 is wound onto storage device 110 in step 410. Prior to unwinding, a terminal pipe section 20 is connected to the lead end of the tow string. Steps 420 and 430 can follow the connection of the terminal pipe section. After unwinding step 430, a second terminal pipe section 20 can be connected to the trailing end of the tow string, or it can be connected prior to or during the winding operation. The two terminal pipe sections 20 are connected such that pressure isolation devices 30 and/or redundant pressure isolation devices 25 are oriented so as to maintain the pressure in the main pipe section above a minimum set pressure when operated. Step 440 can follow the installation of the terminal pipe section 20 to the trailing end of the tow string. Additional installation aids, interconnection assemblies, or buoyancy can be installed on the pipe as necessary.

Once the trailing end of the pipe string is offshore it can be parked to connect additional vessels, add buoyancy, or perform other tasks such as increasing the internal pressure.

The length of a towed pipeline string is often limited by the length of the available fabrication site. The present technique can eliminate the need for a site length equal to or exceeding the length of the towed pipeline string. To create longer tow strings, it is possible to tow a stalk offshore and park with the trailing end onshore for welding to the next stalk. This could block alongshore vessel traffic. The fabrication method disclosed herein can reduce the time a pipe string blocks a shipping corridor alongshore.

Additionally, by using an onshore storage device 110 rather than a vessel mounted reel, the device size is not constrained. The larger the device diameter, the more pipe that can be stored. This allows longer pipe segments 5 to be fabricated than has previously been possible for towing or reeling. A larger diameter storage device 110 also allows larger diameter pipe to be wound without significant residual bending. This can result in a straighter pipe, which can enhance control of the pipe string as it moves through the water. An onshore storage device 110 also allows for larger diameter pipe to be reeled than for ship mounted reels, which typically are limited to drum diameters less than 30 meters and handle pipe diameters from 5 cm to 45 cm (2 in. to 18 in.).

For example, a storage device 110 having a drum diameter of 370 meters can store steel pipe having a nominal outside diameter of 61 cm (24 in.) without exceeding the specified minimum yield strength of the material. Approximately twenty-four kilometers of 61 cm (24 in.) nominal outside diameter pipe can be stored in 24 wraps on such a device consisting of 6 layers of pipe 4 pipe diameters high. Storage device 110 can have a diameter as large as site geometry permits, with larger diameters allowing the winding of larger diameter rigid pipe. Storage device 110 can be constructed of a monolithic unit or can be made of discrete units such as railroad cars on a track or barges in a canal. Storage device 110 need not be circular, as long as the bending radius of the pipe can be kept above a minimum bending radius no matter what geometric path the pipe takes. Bending and unbending fatigue can thus be maintained within acceptable limits.

Numerous embodiments and alternatives of the present invention have been disclosed. While the above disclosure includes what is believed to be the best mode for carrying out the invention, as contemplated by the inventor, not all possible alternatives have been disclosed. For that reason, the scope and limitation of the present invention is not to be restricted to the above disclosure, but is instead to be defined and construed by the appended claims.

What is claimed is:

1. A pipeline segment for use in constructing a thin-walled underwater pipeline, comprising:
   a main pipe section comprising two or more joints of pipe;
   terminal pipe sections at either end of the main pipe section wherein the terminal pipe sections are more resistant to external-pressure collapse relative to the main pipe section;
   at least one pressure isolation device in each terminal pipe section to maintain internal pressure in the main pipe section above a set shut off pressure; and
   a pressure compensation system in communication with the main pipe section.

2. The pipeline segment of claim 1 wherein the terminal pipe sections are thick-walled relative to the main pipe section.

3. A thin-walled underwater pipeline system, comprising: a series of the pipeline segments of claim 2.

4. The thin-walled underwater pipeline of claim 3, wherein the pressure compensation system is in communication with at least one of the main pipe sections.

5. The pipeline segment of claim 1 wherein the terminal pipe sections comprise a plurality of redundant pressure isolation devices.

6. The pipeline segment of claim 1 wherein the main pipe section is gas-pressurized above atmospheric pressure.

7. The pipeline segment of claim 1 further comprising a first towing assembly attached adjacent a first end of the pipeline segment.

8. The pipeline segment of claim 7 further comprising a second towing assembly attached adjacent a second end of the pipeline segment.

9. The pipeline segment of claim 8 wherein the towing assemblies are attached to the terminal pipe sections.

10. A thin-walled underwater pipeline system, comprising: a plurality of the pipeline segments of claim 1 connected together.

11. The thin-walled underwater pipeline system of claim 10 wherein the pressure compensation system is in communication with at least one of the main pipe sections.

12. A method of making the thin-walled underwater pipeline segment of claim 1, comprising:
   attaching terminal pipe sections at either end of a main pipe section wherein the terminal pipe sections are more resistant to external-pressure collapse relative to the main section;
   installing a pressure isolation device in each terminal pipe section;
   installing a pressure compensation system in communication with the main pipe section to introduce pressurized fluid into the main pipe section when an internal pressure in the main pipe section drops below a set re-pressurization pressure;
   pressurizing the main pipe section to a pressure above atmospheric pressure; and
   operating the pressure isolation device to maintain internal pressure in the main pipe section above a set shut off pressure.

13. The method of claim 12, further comprising:
   winding the main pipe section on a reel;
   attaching a lead end of pipe from the reel at a marine terminal to a first marine tow vessel adjacent the marine terminal; and
   unwinding the main pipe section from the reel at the marine terminal while towing the lead end with the first marine tow vessel.

14. The method of claim 13 further comprising attaching a trailing end of the pipe to a second marine tow vessel adjacent the marine terminal.

15. The method of claim 14 wherein the attaching to the first and second tow vessel further comprises attaching a first towing assembly to the lead end of the pipe and attaching a second towing assembly to the trailing end of the pipe.

16. The method of claim 15 wherein the unwinding further comprises attaching a buoyancy device to the pipe intermediate the leading and trailing ends.

17. The pipeline segment of claim 1 wherein the pressure compensation system comprises:
   a vessel having an inlet in communication with a source of pressurized fluid and an outlet in communication with the main pipe section;
   a first pressure isolation device adjacent the inlet;
   a second pressure isolation device adjacent the outlet; and
   a trap in communication with the vessel intermediate the first and second pressure isolation devices.

18. The pipeline segment of claim 1, wherein the at least one pressure isolation device is independently selected from the group consisting of a high integrity pipeline protection system (HIPPS), modified subsea safety isolation valves (SSIV), flow check valves, pressure check valves, chokes, pressure regulators, and swing check valves.

19. The pipeline segment of claim 1, wherein the pressure compensation system comprises a piston, bellows or diaphragm type compensation system, a pipeline flooding system, or a pressurized gas supply.

20. The pipeline segment of claim 1, wherein the main pipe section has a wall thickness that is 68% or less than the wall thickness of the terminal pipe sections.

21. A method of making the thin-walled underwater pipeline system of claim 10, comprising:
   attaching terminal pipe sections at either end of a main pipe section wherein the terminal pipe sections are thick-walled relative to the main section;
   installing a pressure isolation device in each terminal pipe section;
   pressurizing the main pipe section to a pressure above atmospheric pressure;
   operating the pressure isolation device to maintain internal pressure in the main pipe section above a set shut off pressure;
   repeating the attachment, installation, pressurization and operation to provide a plurality of pipeline segments;
   submerging the pipeline segments; and
   sequentially connecting the pipeline segments to form the pipeline system.

22. The method of claim 21, further comprising:
   winding the main pipe section on a reel; and
   unwinding the main pipe section from the reel.

23. The method of claim 21, comprising:
   winding the main pipe section on a reel;
   attaching a lead end of pipe from the reel at a marine terminal to a first marine tow vessel adjacent the marine terminal;
   unwinding the main pipe section from the reel at the marine terminal while towing the lead end with the first marine tow vessel; and
   attaching a trailing end of the pipe to a second marine tow vessel adjacent the marine terminal.

24. The method of claim 23 wherein the attaching to the first and second tow vessels further comprises attaching a first towing assembly to the lead end of the pipe and attaching a second towing assembly to the trailing end of the pipe.

25. The method of claim 23 wherein the unwinding further comprises attaching a buoyancy device to the pipe intermediate the leading and trailing ends.

26. The method of claim 21 further comprising excluding liquid from the main pipe section during towing sufficient to maintain positive buoyancy.

27. The method of claim 21 further comprising excluding liquid from the main and terminal pip sections during the submersion and connection.

28. The pipeline system of claim 21 further comprising installing redundant pressure isolation devices in the terminal pipe sections.

29. The method of claim 21 further comprising:
   operating the pressure compensation system to maintain the internal pressure in the said main pipe section at or above the re-pressurization pressure.

30. A pipeline segment for an underwater pipeline, comprising:
   a first pipe section having a first wall thickness, wherein the first pipe section comprises two or more joints of pipe;
   a second pipe section having a second wall thickness disposed on at least one end of the first pipe section, wherein the second wall thickness of the second pipe section is greater than the first wall thickness of the first pipe section;
   at least one pressure isolation device disposed within the second pipe section to maintain internal pressure in the first pipe section above a set shut off pressure; and a pressure compensation system in communication with the first pipe section.

31. The pipeline segment of claim 30, wherein the first wall thickness of the first pipe section is 68% or less than the second wall thickness of the second pipe section.

32. The pipeline segment of claim 30, wherein the first wall thickness of the first pipe section is 59% or less than the second wall thickness of the second pipe section.

33. The pipeline segment of claim 30, wherein the first wall thickness of the first pipe section is 43% or less than the second wall thickness of the second pipe section.

34. An underwater pipeline, comprising: two or more adjoining pipeline segments, each pipeline segment comprising:
   a first pipe section having a first wall thickness, wherein the first pipe section comprises two or more joints of pipe;
   a second pipe section having a second wall thickness disposed on at least one end of the first pipe section, wherein the second wall thickness of the second pipe section is greater than the first wall thickness of the first pipe section;
   at least one pressure isolation device disposed within the second pipe section to maintain internal pressure in the first pipe section above a set shut off pressure; and
   a pressure compensation system in communication with the main pipe section.

35. The pipeline of claim 34, wherein the first wall thickness of the first pipe section is 68% or less than the second wall thickness of the second pipe section.

36. The pipeline of claim 34, wherein the first wall thickness of the first pipe section is 59% or less than the second wall thickness of the second pipe section.

37. The pipeline of claim 34, wherein the first wall thickness of the first pipe section is 43% or less than the second wall thickness of the second pipe section.

38. A pipeline segment for an underwater pipeline, comprising:
   a first pipe section having a first wall thickness;
   a second pipe section having a second wall thickness disposed on at least one end of the first pipe section, wherein the second wall thickness of the second pipe section is greater than the first wall thickness of the first pipe section;
   at least one pressure isolation device disposed within the second pipe section to maintain internal pressure in the first pipe section above a set shut off pressure, wherein the at least one pressure isolation device permits fluid flow in at least one direction when the pressure is above the set shut off pressure; and
   a pressure compensation system in communication with the first pipe section.

* * * * *